UNITED STATES PATENT OFFICE.

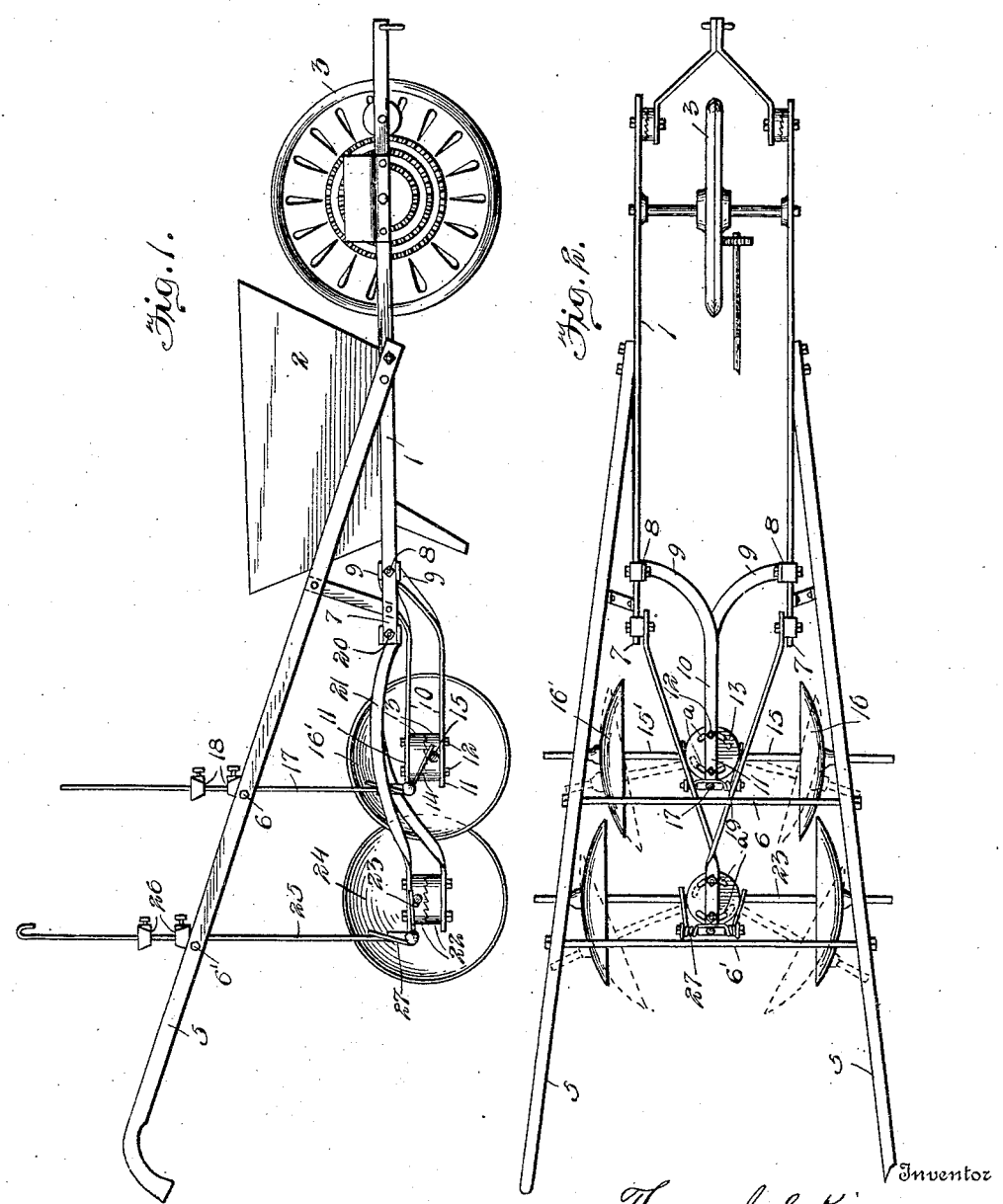

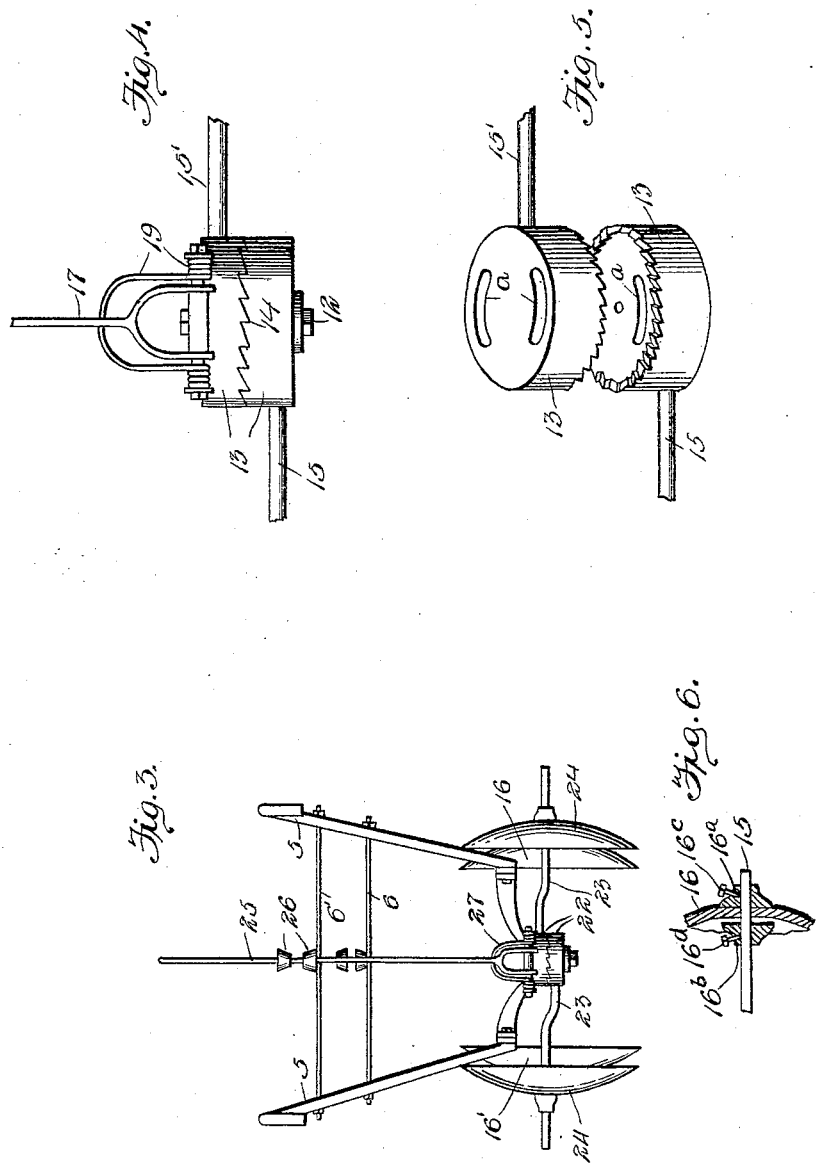

THOMAS JOEL KING, OF RICHMOND, VIRGINIA.

LISTING AND BEDDING MACHINE.

No. 930,192.     Specification of Letters Patent.     Patented Aug. 3, 1909.

Application filed February 2, 1909. Serial No. 475,556.

*To all whom it may concern:*

Be it known that I, THOMAS J. KING, a citizen of the United States, residing at Richmond, in the county of Henrico and State of Virginia, have invented certain new and useful Improvements in Listing and Bedding Machines, of which the following is a specification, reference being had therein to the accompanying drawing.

My invention relates to improvements in listing and bedding machines, the main object being the provision of a machine having a series of disks, each of which is independent of the other and adjustable independently, where each disk may be run at different angles, thus allowing the operator to produce a sharp top or flat top bed; a high or a low bed; a wide or a narrow bed; or which can operate where the land is broken in ridges, as for instance, where the cotton stalks are "thrown out" or the beds reversed instead of breaking the land level, as is done ordinarily, the disks being at all times so arranged as to run deep and pulverize thoroughly.

To clearly illustrate my invention and bring out the construction, thereof, attention is invited to the accompanying drawings, in which:—

Figure 1 is a side elevation of the complete machine. Fig. 2 is a top plan view with the hopper removed. Figs. 3, 4 and 5 are detail views of parts. Fig. 6 is a detail section of a disk and its adjusting means, whereby the disks may be placed nearer together or farther apart.

Referring to the drawings:—The numeral 1 designates the main frame, which carries the hopper 2, and the furrow making power wheel 3. Rigidly secured to the frame so as to manipulate and guide the machine, are the handles 5, connected together in unison, by means of the two cross-bars 6 and 6'.

Secured pivotally to the rear ends 7, of the frame at 8, are the two outwardly curved ends 9, of the forward disk carrying frame or arms 10. Held between the rear free ends 11 of the arms 10, by means of the adjusting and clamping bolts 12, are the two disks 13, whose opposed faces are serrated or corrugated as at 14. In order to allow for any radial adjustment of these disks 13, the same are provided with the elongated openings $a$, through which bolts 12 pass.

Carried by the lower disk is the arm 15, while carried by the upper disk is the arm 15', which arms have adjustably and rotatably mounted thereon the disks 16 and 16', which constitute the forward pair of pulverizing disks. These disks and also the disks 22 are adjustably mounted upon their respective arms, through the medium of the device, clearly shown in Fig. 6. As here shown, the disk is rotatably mounted upon the arm and is held against outward displacement by means of the outer stop $16^a$, which is detachably and adjustably secured upon the arm by means of the set-screw $16^c$, while the inner stop $16^b$, which is held in place by the set-screw $16^d$, limits the inward movement of the disk. By this means the disks may be moved and held near to or farther away from their pivotal points, thus allowing a wider or narrow portion of the ground to be acted upon. In order to regulate the depth at which these disks cut, I employ the rod 17, whose lower end is pivoted to the rear ends of the arms 10, and projects upwardly to near the forward cross-bar 6, the adjustable cones or stops 18, being adapted to engage said cross-bar and thus hold the forward disks in adjusted position. The coiled spring 19, normally holds the rod toward the cross-bar 6 and thus in engagement therewith.

Pivotally secured to the extreme rear ends of the frame at 20, are the forward ends of the frame or arm 21, in which are adjustably carried the disks 22, which are similar in construction to the disks 13, and carry the rear disk carrying arms 23, which are similar to the arms 15 and 15', the rear disks 24 being mounted in the same manner as the disks 16 and 16'. The rod 25 is pivoted to the rear end of the pivoted frame 21, and carries the adjusting cones 26, which are similar to the cones 18, the cones 26 acting upon the rear cross-bar 6', to hold the rear disks adjusted. The spring 27 holds this rod toward and in engagement with the cross-bar 6'.

The lower adjusting cones 18 and 26, respectively, have their large ends downward, and are thus arranged to abut the upper side of the cross-bars 6 and 6', respectively, to prevent the downward movement of the disks during the working in soft ground, but when the ground is stiffer or harder, the upper cones 18 and 26, respectively, are used, their inverted bases engaging the underside of the cross-bars 6 and 6', respectively. and thus holding the disks against an upward movement.

From the foregoing description, the operation of my improved listing and bedding machine is readily understood, and it will be seen that each disk runs independently of the other that by means of the adjustable disks carrying the arms, the disks may be given any desired angle adjustment, while with the adjustable stops 16$^a$ and 16$^b$, they are allowed to be moved inwardly or outwardly upon the arms, to either operate to produce a wide or a narrow bed, a sharp or a flat top bed, a high or a low bed, and when operating upon a hillside, the disks on the upper side may be adjusted to throw dirt only slightly, while the lower disks are adjusted to throw the dirt high, thus making a flat bed on hillsides. Also where the land is broken in ridges, that is where cotton stalks are "thrown out", or the beds reversed instead of breaking the land level, my machine is invaluable.

I have found that the use of four disks, even when listing, is invaluable as they will more thoroughly pulverize the dirt, and do not leave soil unbroken, as do two disks.

By means of the spring actuated adjusting rods and their cone stops, the disks are held automatically at the desired depth, or held out of the ground, which is very desirable in turning and in going to and from the field.

What I claim, as new, is:—

1. In a machine, the combination of a supporting frame, a handle carried thereby and provided with a series of cross bars, a forward frame pivoted to the supporting frame, a pair of arms adjustably carried by said frame, a disk adjustably mounted upon each arm, another frame pivotally secured to the supporting frame, a pair of arms adjustably connected to said pivoted frame, a disk adjustably connected to each arm, two rods, one connected to each of said pivoted frames, and means adjustably mounted upon said rods for engaging the cross-bars, whereby the pivoted frames are held in adjusted position.

2. An adjusting device and support for a pair of disks, comprising two disks having their opposed faces corrugated and provided with alining curved openings, means passing through said openings to clamp the disks when adjusted, and arms one carried by each disk, for supporting the cutting disks.

In testimony whereof I affix my signature in presence of two witnesses.

THOMAS JOEL KING.

Witnesses:
   S. E. BROWN,
   C. W. WINN.